US010851205B2

United States Patent
Le et al.

(10) Patent No.: US 10,851,205 B2
(45) Date of Patent: *Dec. 1, 2020

(54) PURIFICATION OF POLY ETHER KETONE KETONE BY CENTRIFUGAL FILTRATION

(71) Applicant: Arkema France, Colombes (FR)

(72) Inventors: Guillaume Le, Hérouville-Saint-Clair (FR); Jérôme Amstutz, Charly (FR); Christophe Caremiaux, Cesseville (FR)

(73) Assignee: ARKEMA FRANCE, Colombes (FR)

( * ) Notice: Subject to any disclaimer, the term of this patent is extended or adjusted under 35 U.S.C. 154(b) by 121 days.

This patent is subject to a terminal disclaimer.

(21) Appl. No.: 16/038,678

(22) Filed: Jul. 18, 2018

(65) Prior Publication Data

US 2019/0077911 A1   Mar. 14, 2019

(30) Foreign Application Priority Data

Jul. 18, 2017   (EP) ..................................... 17305956

(51) Int. Cl.
  *C08G 65/40*    (2006.01)
  *C08G 61/12*    (2006.01)
  *C08G 65/46*    (2006.01)
  *C08G 75/23*    (2006.01)

(52) U.S. Cl.
  CPC ....... *C08G 65/4093* (2013.01); *C08G 61/127* (2013.01); *C08G 65/4012* (2013.01); *C08G 65/46* (2013.01); *C08G 75/23* (2013.01); *C08G 2261/3442* (2013.01)

(58) Field of Classification Search
  CPC ............ C08G 75/23; C08G 2261/3444; C08G 18/3872; C08G 65/4093
  See application file for complete search history.

(56) References Cited

U.S. PATENT DOCUMENTS

| 4,698,393 A | 10/1987 | Jansons et al. |
| 4,716,211 A | 12/1987 | Clendinning et al. |
| 4,816,556 A | 3/1989 | Gay et al. |
| 4,841,013 A | 6/1989 | Towle |
| 4,912,181 A | 3/1990 | Becker et al. |
| 10,344,125 B2* | 7/2019 | Le ............................ C07C 41/36 |
| 2007/0265415 A1 | 11/2007 | Richter et al. |
| 2011/0070442 A1* | 3/2011 | Asano .................... C08G 75/23 428/402 |
| 2015/0183918 A1* | 7/2015 | Le ............................ C08G 8/02 528/125 |
| 2017/0260294 A1* | 9/2017 | Toyama ................... C08L 1/14 |

FOREIGN PATENT DOCUMENTS

| CN | 102161739 | * | 8/2011 | ............... C08G 8/02 |
| CN | 202744482 U | | 2/2013 | |
| CN | 104892926 A | | 9/2015 | |
| EP | 2682255 A1 | | 1/2014 | |
| GB | 1558615 A | | 1/1980 | |
| WO | 9001510 A1 | | 2/1990 | |
| WO | 9010024 A1 | | 9/1990 | |
| WO | 2011004164 A2 | | 1/2011 | |

OTHER PUBLICATIONS

Search Report dated Nov. 14, 2017, by the European Patent Office for Application No. 17305956.9.

* cited by examiner

*Primary Examiner* — Shane Fang

(74) *Attorney, Agent, or Firm* — Buchanan Ingersoll & Rooney P.C.

(57) ABSTRACT

A method for the manufacture of polyether ketone ketone (PEKK), including the steps of: reacting 1,4-bis(4-phenoxybenzoylbenzene) and/or diphenylether with at least one difunctional aromatic acyl chloride, in a reaction solvent and in presence of a Lewis acid, to obtain a product mixture including a PEKK-Lewis acid complex; contacting the obtained product mixture with a protic solvent, so as to form a dispersion that includes a liquid phase including Lewis acid and a second phase, e.g., a solid phase, including PEKK; and separating the second phase from the liquid phase by centrifugal filtration, so as to recover a crude PEKK and a effluent containing Lewis acid, wherein step (iii) includes a step of centrifugal filtration.

14 Claims, No Drawings

PURIFICATION OF POLY ETHER KETONE KETONE BY CENTRIFUGAL FILTRATION

CROSS REFERENCE TO RELATED APPLICATIONS

The present application claims the benefit of European Application No. 17305956, filed on Jul. 18, 2017. The entire contents of European Application No. 17305956 are hereby incorporated herein by reference in their entirety.

TECHNICAL FIELD

The present application relates to a method for manufacturing polyether ketone ketone polymers by electrophilic substitution.

TECHNICAL BACKGROUND

Polyether ketone ketone (PEKK) polymers have a number of properties which make them useful for applications involving exposure to high temperature or to high mechanical or chemical stress. They are, for instance, useful in the aerospace industry, in off-shore drilling and in medical devices.

One known route for manufacturing polyether ketone ketone polymers relies on nucleophilic substitution by fluorinated monomers. This process necessitates specific fluorinated and/or chlorinated monomers, which must be manufactured. Further, the reaction is carried out in harsh conditions (350-400° C. in diphenylsulfone) and requires restrictive purification steps to eliminate salts and solvent.

Another route for preparing polyether ketone ketone relies on electrophilic substitution reaction between aromatic acid chlorides and aromatic ethers in presence of a Lewis acid. This process is described in U.S. Pat. No. 4,841,013; U.S. Pat. No. 4,816,556; U.S. Pat. No. 4,912,181; U.S. Pat. No. 4,698,393; U.S. Pat. No. 4,716,211 and WO 2011/004164. The reaction is advantageous in that it may be carried out at moderate temperature (−20-120° C.) compared to the nucleophilic route. Furthermore, both the monomers and solvents are readily available.

The process may in particular rely on diphenylether (as described in U.S. Pat. No. 4,816,556), or on 1,4-bis(4-phenoxybenzoylbenzene) as a starting material. Both paths lead to poly ether ketone ketone.

The process may more specifically rely on 1,4-bis(4-phenoxybenzoylbenzene) as a starting material. This compound can be prepared by reacting terephthaloyl chloride and diphenyl ether in the presence of a Lewis acid such as aluminum trichloride ($AlCl_3$).

Reacting 1,4-bis(4-phenoxybenzoylbenzene) with a mixture of isophthaloyl and terephthaloyl chloride in the presence of a Lewis acid leads to the formation of a polyether ketone ketone—Lewis acid complex. After polymerization, the complex is dissociated by contacting with a protic solvent, so as to recover free polyether ketone ketone, mostly in a solid precipitated form. The crude polyether ketone ketone is then separated from the product mixture by a solid/liquid separation step before being further purified.

An important problem faced in the industrial production of polyether ketone ketone is the efficient separation of the crude polyether ketone ketone from the liquid reaction medium after the polymerization step and decomplexation from the Lewis acid. Another problem is the efficient subsequent purification of the crude polymer.

Indeed, the crude polymer most often forms as a sponge-like gel with a large liquid content, typically more than 50% by weight.

A solid/liquid separation of such a gel by conventional methods such as simple filtration on a Nutsche filter is time consuming and not very efficient. In particular, it is observed that while the interstitial liquid is removed, it is difficult to extract any liquid from within the crude polyether ketone ketone gel and thus also the impurities dissolved in it.

Further purification steps may thus be required to extract residual reactants or side-products from the polymer, in particular the residual Lewis acid, which is used as a catalyst, but in large quantities, typically in excess of stoichiometric amounts. Such impurities adversely affect the thermal stability of the polyether ketone ketone. Thermal stability is particularly crucial for polyether ketone ketones in view of their high melting point (generally >300° C.).

Document WO 90/10024 discloses a process for extracting residual catalyst from polyether ketone ketone, wherein the polymer is washed with a hot aqueous solution of an extraction agent such as a hydroxycarboxylic acid. Such extraction agent must however be subsequently also removed from the polymer to have thermal stability which requires further time consuming and expensive operations.

Document WO 90/01510 describes a process for the purification of polyether ketone ketone without any added agent, wherein the polymer is submitted to a heat treatment followed by a hydrothermal treatment. However, this process implies specific and costly equipment, such as autoclaves, which are exposed to corrosion.

There is thus still a need for a method for manufacturing polyether ketone ketone with a high purity and a high yield, which can be implemented at the industrial scale in an economically realistic manner.

SUMMARY

Embodiments of the present invention provide a method for manufacturing polyether ketone ketone with a high purity and a high yield, and more specifically, a method that may be implemented at the industrial scale in an economically realistic manner.

According to embodiments of the present invention, the solid/liquid separation step comprises a step of centrifugal filtration. Indeed, it has been found that centrifugal filtration is particularly efficient and quick for performing the solid/liquid separation of a crude PEKK polymer suspension.

Moreover, it has been discovered that when submitted to centrifugal filtration, the crude polyether ketone ketone does not build up a high filtration resistance. Indeed, when submitted to filtration under increasing pressure, the resistance provided by the crude PEKK polymer does not increase; surprisingly, the resistance decreases.

As a consequence, it is difficult, if not impossible to develop a compaction stress that would deform the polymer granules sufficiently so as to extract the liquid contained in the granules.

Compaction stress is a parameter that allows evaluation of the directional force applied to the polymer granules during the separation step. Centrifugal filtration allows application of a notable compaction stress and therefore allows a better extraction of the liquid from within the polymer granules through its pores. The compaction stress is proportional to the acceleration rate in a centrifuge and it can thus be varied easily.

It is advantageous to also wash the crude polyether ketone ketone in a centrifugal filtration device, and preferably within the same centrifugal filtration device used for the previous solid/liquid separation. Advantageously, the washing step may be carried out without resuspending the solid in the solvent used for washing. Indeed, it has surprisingly been found that effective washing can be performed in this manner, despite a fairly low contact time. This finding is thought to be connected to the efficient extraction of the Lewis acid from the granules by applying a notable compaction stress.

Since centrifugal filtration allows extraction of a higher proportion of reaction solvent and Lewis acid from the crude polymer granules, a method of an embodiment of the invention allows the preparation of PEKK with a low residual humidity. Accordingly, the time and energy required for drying can be reduced.

Accordingly, it is a first object of embodiments of the invention to provide a method for the manufacture of polyether ketone ketone (PEKK), comprising the steps consisting in:
(i) reacting 1,4-bis(4-phenoxybenzoylbenzene) and/or diphenylether with at least one difunctional aromatic acyl chloride, in a reaction solvent and in presence of a Lewis acid, to obtain a product mixture comprising a PEKK-Lewis acid complex;
(ii) contacting the obtained product mixture with a protic solvent so as to form a dispersion that comprises a liquid phase comprising Lewis acid and a second phase comprising PEKK; and
(iii) separating the second phase of the dispersion from the liquid phase, so as to recover a crude PEKK and an effluent containing Lewis acid, wherein step (iii) comprises a step of centrifugal filtration.

In some embodiments, the liquid phase may contain at least 50% of the Lewis acid in the product mixture, more than 50% of the Lewis acid, at least 70% of the Lewis acid, at least 90% of the Lewis acid.

In some embodiments, the second phase may contain at least 50% of the PEKK in the product mixture, more than 50% of the PEKK, at least 70% of the PEKK, at least 90% of the PEKK.

In some embodiments, the second phase is a solid phase and/or an organic phase.

According to a preferred embodiment, the at least one difunctional aromatic acyl chloride is selected from terephtalic acid chloride, isophtalic acid chloride and the mixtures thereof.

According to a preferred embodiment, the reaction solvent is ortho-dichlorobenzene.

According to a preferred embodiment, the Lewis acid is aluminum trichloride.

According to a preferred embodiment, the protic solvent used in step (ii) is an aqueous solution, which preferably has a pH of not more than 5, more preferably not more than 3 and preferably not more than 2.

According to a preferred embodiment, a method of an embodiment of the invention comprises after step (iii) further one or more steps of washing the crude PEKK in a protic solvent, preferably an alcoholic aqueous solution, and subjecting the resulting mixture to a further solid/liquid separation, preferably comprising a step of centrifugal filtration.

According to a preferred embodiment, a method of an embodiment of the invention comprises after step (iii) further one or more steps of washing the crude PEKK in a protic solvent, preferably water, and subjecting the resulting mixture to a further solid/liquid separation, preferably comprising centrifugal filtration.

According to a preferred embodiment, a method of an embodiment of the invention comprises after step (iii):
(iv) one or more steps of washing the crude PEKK in methanol, and subjecting the mixture obtained to a solid/liquid separation comprising centrifugal filtration; and
(v) one or more steps of washing the PEKK obtained in the previous step in water, and subjecting the mixture obtained to a solid/liquid separation comprising centrifugal filtration to obtain a purified PEKK.

According to a preferred embodiment, step (iii) and each subsequent washing step is performed in a centrifugal filtration device, without removing the crude PEKK between subsequent steps.

According to a preferred embodiment, the step of centrifugal filtration in step (iii) is performed at an acceleration rate of at least 500 g.

According to a preferred embodiment, step (iii) and each subsequent washing step is performed for a duration of one hour or less, preferably 30 minutes or less and in particular 15 minutes or less.

According to a preferred embodiment, a method of an embodiment of the invention further comprises a subsequent step of drying the purified PEKK.

According to a preferred embodiment, the crude PEKK is purified without using a complexing agent.

According to a preferred embodiment, the purified PEKK contains less than 1000, preferably 500, and in particular 250 ppm of aluminum.

According to a preferred embodiment, the effluent containing Lewis acid is recycled, notably as a flocculation agent for water treatment.

Embodiments of the invention will now be described in more detail without limitation in the following description.

DETAILED DESCRIPTION OF EMBODIMENTS

Polyaryl ether ketones, also known as PAEK, prepared according to embodiments of the invention correspond to the following formula:

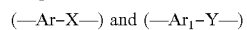

in which:
Ar and $Ar_1$ each denote a divalent aromatic radical;
Ar and $Ar_1$ may be chosen, preferably, from 1,3-phenylene, 1,4-phenylene, 4,4'-biphenylene, 1,4-naphthylene, 1,5-naphthylene and 2,6-naphthylene;

The polyether ketone ketone (PEKK) comprises units of the following formulas:

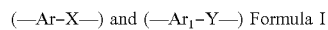 Formula I wherein:
Ar and $Ar_1$ represent each a divalent aromatic radical and are preferably selected among 1,3-phenylene and 1,4-phenylene;
X represents an electron-withdrawing group which is preferably a carbonyl group; and
Y represents an oxygen atom.

Notably, the polyether ketone ketone comprises moieties of formula II A, of formula II B or a mixture thereof:

Formula II A

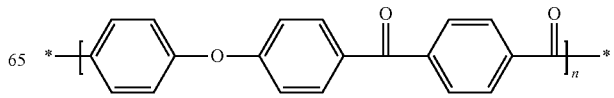

-continued

Formula II B

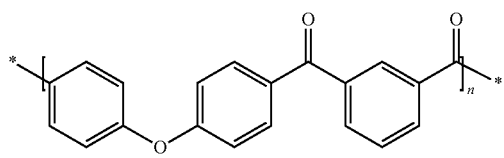

The polyether ketone ketone may consist of said moieties of formula IIA and/or IIB. According to a preferred embodiment, the polyether ketone ketone consists of, or consists essentially of moieties of formula IIA and IIB. Among these polymers are especially preferred polyether ketone ketones that have a molar ratio of moieties of formula IIA: moieties of formula IIB (also called T:I ratio) that is comprised between 50:50 and 99:1, and in some embodiments from 55:45 to 85:15, in particular from 60:40 to 80:20.

Alternatively, the polyether ketone ketone may comprise other aromatic moieties of the formula I above, notably moieties where Ar and $Ar_1$ may also be selected from bicyclic aromatic radicals such as 4,4'-diphenylene or divalent fused aromatic radicals such as 1,4-naphtylene, 1,5-naphtylene and 2,6-naphtylene.

According to a preferred embodiment, embodiments of the invention are particularly suited for producing PEKK with a molecular weight such as its inherent viscosity in 96% acid sulfuric according to ISO 307 is between 0.5 and 1.5 dL/g, preferably between 0.6 and 1.2 dL/g, more preferably between 0.7 and 1.1 dL/g According to a convenient route to make polyether ketone ketone, 1,4-bis(4-phenoxybenzoylbenzene) is reacted with at least one difunctional aromatic acyl chloride.

1,4-bis(4-phenoxybenzoylbenzene) is the compound of formula III:

(III)

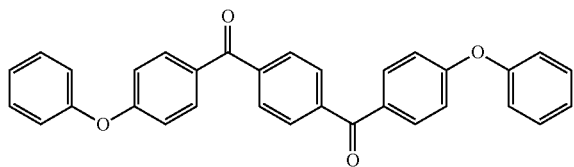

The compound of formula (III) may be made by reacting terephthaloyl chloride with diphenyl ether in a solvent and in the presence of a Lewis acid, acting as a Friedel-Crafts catalyst. The reaction results in the production of 1,4-bis(4-phenoxybenzoylbenzene) which is predominantly in the form of a complex with the Lewis acid.

The polyether ketone ketone may be obtained by reaction of said 1,4-bis(4-phenoxybenzoylbenzene) with at least one difunctional aromatic acyl chloride.

The difunctional aromatic acyl chloride may in particular include terephthaloyl chloride, isophthaloyl chloride and more preferably a mixture of terephthaloyl chloride and isophthaloyl chloride.

The reaction is preferably implemented in a solvent. The solvent is preferably a non-protic solvent, which can in particular be selected from methylene chloride, carbon disulfide, ortho-dichlorobenzene, meta-dichlorobenzene, para-dichlorobenzene, 1,2,4-trichlorobenzene, 1,2,3-trichlorobenzene, ortho-difluorobenzene, 1,2-dichloroethane, 1,1,2,2-tetrachloroethane, tetrachloroethylene, dichloromethane, nitrobenzene and mixtures thereof. Ortho-dichlorobenzene is a preferred solvent.

The reaction is implemented in the presence of a Lewis acid as a catalyst.

Lewis acids which may be used include, for example, aluminum trichloride, aluminum tribromide, antimony pentachloride, antimony pentafluoride, indium trichloride, gallium trichloride, boron trichloride, boron trifluoride, zinc chloride, ferric chloride, stannic chloride, titanium tetrachloride, and molybdenum pentachloride. Aluminum trichloride, boron trichloride, aluminum tribromide, titanium tetrachloride, antimony pentachloride, ferric chloride, gallium trichloride, and molybdenum pentachloride are preferred. Aluminum trichloride is preferred.

The reaction is further preferably conducted in the presence of a suitable chain stopper. A chain stopper is a monofunctional compound added so as to control the chain length of the polyether ketone ketone.

Suitable chain stoppers in the present reaction are notably benzoic acid chloride or phenoxybenzophenone.

The polymerization is performed in a reactor. The reactor can be for instance a glass reactor, a glass-lined reactor or a PTFE coated reactor.

According to some variations, the materials introduced into the reactor in a method of an embodiment of the invention consist essentially, or consist, of 1,4-bis(4-phenoxybenzoylbenzene) and the at least one difunctional aromatic acyl chloride, the reaction solvent, the Lewis acid and the chain stopper.

According to one embodiment of the invention, an initial reactant mixture comprising (and preferably consisting of) terephthaloyl chloride, isophtaloyl chloride, the chain stopper and 1,4-bis(4-phenoxybenzoylbenzene) in the reaction solvent is provided. The reactant mixture can be made by mixing the three components together, in any order. By way of example, the dry solvent can be introduced first in the reactor, and then the two reactants can be added to the reactor.

A first phase of the reaction can be carried out by mixing the reactants at a temperature ranging from e.g. −5 to 25° C.

As a second step, the Lewis acid is added to the reactant mixture. Preferably, the Lewis acid is added as a solid. Alternatively, it can also be added as a suspension or a solution, preferably in the abovementioned solvent.

According to another embodiment of the invention, the reactant mixture comprises or consists of diphenylether, at least one difunctional aromatic acyl chloride, the reaction solvent, the Lewis acid and the chain stopper.

Processing aids such as dispersants or antifouling agents may be added to the reaction mixture if required.

The polymerization can be carried out at a temperature ranging from e.g. 50 to 120° C. The conditions and equipment are preferably chosen in such a way that the polymer is obtained in granular form. If necessary, the crude polymer may be granulated using suitable milling equipment.

Once the reaction has been completed to the desired degree, the reactant mixture is designated as the product mixture.

After the reaction has been completed to the desired degree, a method of an embodiment of the invention comprises steps for purifying polyether ketone ketone from the product mixture, and in particular from the solvent, catalyst and unreacted reactants as well as by-products.

In particular, said purification comprises the step of contacting the product mixture with a protic solvent, so as to recover a first phase containing the Lewis acid and a second phase containing polyether ketone ketone. The relative weight ratio of protic solvent and product mixture contacted is preferably from 5 to 100, more preferably from 15 to 50.

The protic solvent can be an aqueous solution.

The aqueous solution can be simply water. Alternatively, it can be an acidic solution, such as a solution of hydrochloric acid. A preferred aqueous solution is water acidified by addition of up to 10 wt. %, preferably up to 0.4 wt. % of suitable acid, for instance concentrated hydrochloric acid. Preferably, the pH of the aqueous solution is not more than 7, preferably not more than 6, or not more than 5, or not more than 4, or not more than 3, or not more than 2. The dissociation of the polyether ketone ketone-Lewis acid complex is more efficient when an acidic solution is used.

Mixtures of solvents can also be used, such as an aqueous-organic solvent, e.g. an aqueous solution mixed with methanol, ethanol, isopropanol or acetic acid. The proportions of the alcohol in the mixture should be sufficient to allow for good elimination of the aluminum but however limited so as to avoid side reactions. A good compromise is a mixture of aqueous solution and alcohol comprising 95 to 60 wt. %, preferably 80 to 95 wt. % of alcohol.

A first possibility for contacting the polyether ketone ketone-Lewis acid complex with the protic solvent is to add the protic solvent to the product mixture, for example directly in the reactor. The addition is preferably performed progressively, over a period of time which can advantageously range from 10 to 180 minutes, preferably from 30 to 90 minutes at a temperature >50° C., preferably between 60 and 160° C.

A second possibility is to provide the protic solvent in a separate vessel and to subsequently add the product mixture to the protic solvent. The addition is preferably performed progressively, over a period of time which can advantageously range from 10 to 180 minutes, preferably from 30 to 90 minutes at a temperature >50° C., preferably between 60 and 160° C.

Both in the first and second possibility, the mixture of protic solvent and product mixture is preferably agitated, using e.g. an agitation device such a mechanical stirrer (which may comprise one or more impellers) or a recirculation loop with a pump.

Once the total of the product mixture and of the protic solvent have been contacted, the mixture of both can be maintained, preferably with agitation, for a period of time of e.g. from 10 to 240 minutes, preferably from 30 to 120 minutes at a temperature >75° C., preferably between 80 and 160° C.

Temperature may optionally be controlled at this stage, and for instance the mixture may be cooled.

In an alternative variation, the temperature is not controlled at this stage, and it thus rises, possibly up to the boiling point of one or more of the solvents (including e.g. water) present in the mixture, and even above 100° C. if the reaction is carried out under pressure. The steam thus generated can be collected and then treated and/or recycled or disposed of. The mixture can optionally cool down (or be actively cooled down) after this exothermic surge. Temperature control and cooling devices as already mentioned above may be used to this end.

At the end of the step of contacting the product mixture with a protic solution, a first phase (containing protic solvent) and a second phase (containing reaction solvent) may be obtained. For instance, if an aqueous solution is used as the protic solvent, the first phase is an aqueous phase and the second phase is an organic phase. Polyether ketone ketone is mostly present in the second phase, while the Lewis acid is mostly present in the first phase. Such complex mixtures, involving solids and two or more liquid phases are generally more challenging to separate. In a preferred embodiment, the aqueous phase, if present, may be separated from the product mixture before or after the centrifugal filtration described below, e.g. by decantation.

It has been found that the morphology of the solid form of polyether ketone ketone is a parameter affecting the efficiency of the solid/liquid separation step. Indeed, polyether ketone ketones tend to form after dissociation of the complex a gel containing high amounts of liquid.

So as to facilitate separation from the surrounding liquid, the polymer may be granulated if it is not obtained in this form. The crude polymer granules obtained are porous and contain high amounts of liquid, and therefore are difficult to separate by conventional filtration.

However, it has been discovered that a solid/liquid separation comprising a centrifugal filtration is an appropriate method.

According to a process of an embodiment of the invention, the solid/liquid separation step to recover polyether ketone ketone from the mixture thus comprises a step of centrifugal filtration, in a centrifugal filtration device.

The unexpected efficiency of centrifugal filtration for the solid/liquid separation of crude polyether ketone ketone is believed to be linked to a compaction stress developed in such filtration devices that is higher compared to conventional filtration. The compaction stress then allows a deformation of the polymer granules and allows the extraction of the liquid from within the granules.

As mentioned above, the compaction stress in a centrifuge is proportional to the acceleration rate. Accordingly, it is preferred that the final step of solid/liquid separation after mothers-liquors filtration and washing is carried out under an acceleration rate that corresponds to a compaction stress of at least 0.5 bar during at least 5 minutes and more preferably 15 minutes.

Preferably, the acceleration used corresponds to a compaction stress that is comprised between 0.5 and 30 bars, and even more preferably between 2 and 15 bars.

The acceleration rate of the centrifuge during the solid/liquid separation step can be constant or variable. According to a preferred embodiment, the acceleration rate is variable. In particular, the acceleration rate may be increased at the end of the solid/liquid separation step.

Throughout present application, unless indicated otherwise, the acceleration rate considered for a variable acceleration rate embodiment is the maximum acceleration rate.

The acceleration rate for the solid/liquid separation is preferably at least 300 g, even more preferred at least 500 g, in particular at least 800 g and particularly preferred at least 1000 g.

At the end of the centrifugal filtration, the acceleration rate may be advantageously increased. As an example, the acceleration rate can be raised during the last quarter, preferably the last 20%, the last 15% or the last 10% of the entire duration of the centrifugal filtration. The increased acceleration rate is preferably at least 500 g and more preferably at least 800 and in particular at least 1200 g. The acceleration rate, prior to the rate being raised during the last quarter, preferably the last 20%, the last 15% or the last 10% of the entire duration of the centrifugal filtration, may be at least 300 g, even more preferred at least 500 g, in particular at least 800 g and particularly preferred at least 1000 g. The acceleration rate increase may be at least 50 g, at least 100 g, or at least 200 g.

The solid/liquid separation step is advantageously performed at a temperature that ranges from 5° C. to 90° C. A separation temperature of at least 20° C. is preferred, in particular if an aqueous solution is used as a protic solvent.

The duration of the centrifugal filtration is generally between 15 to 60 minutes, preferably 30 minutes or less and in particular 15 minutes or less.

If advantageous, it is possible to build the cake by charging the device in several steps. However, it is generally preferred that the centrifugal filtration be carried out in one batch.

The dry solid matter content of the crude polyether ketone ketone product at the end of the solid/liquid separation step comprising a centrifugal filtration is preferably from 10 wt. % to 90 wt. %, preferably from 20 to 80 wt. % and in particular from 30 to 60 wt. %.

In some embodiments, the crude PEKK has a residual humidity of less than 80%, less than 75%, less than 70%, or less than 65%. The residual humidity is measured using a halogen moisture analyzer (Mettler Toledo HR73) at 200° C. until constant weight.

The liquid effluents, containing the first phase and the second phase may optionally be separated so as to be recovered separately, preferably by decantation. A surfactant can be added in order to facilitate the phase separation.

Solid polyether ketone ketone, together with residual impurities, is recovered after the solid/liquid separation step.

The liquid effluents containing the Lewis acid may be submitted to suitable treatments so as to allow their reuse or recycling into the process. In particular, the effluents comprising Lewis acid may be recycled, notably as a flocculation agent for water treatment.

In preferred variations of the process, said crude polyether ketone ketone is further purified by washing with one or more protic solvents.

The protic solvent at this stage is preferably water or an aqueous solution. However, in alternative variations, the protic solvent at this stage may be an organic solvent, optionally mixed with water. Aliphatic straight or branched alcohols such as methanol, ethanol and isopropanol are particularly preferred organic solvents. These organic solvents may optionally be mixed with another and/or with water.

The weight ratio of protic solvent used at this stage to crude polyether ketone ketone may be e.g. be from 2 to 30, preferably from 3 to 10.

After the washing step or concomitantly with the washing step, another solid/liquid separation step may be performed.

The washing step may be performed by mixing the crude polyether ketone ketone recovered at the previous step with the protic solvent in a vessel. The duration of such a washing step may be e.g. from 15 min to 240 min, preferably from 15 to 120 min.

However, in preferred variations, use is made of a centrifugal filtration device, so that washing and solid/liquid separation may be performed concomitantly in this device, without re-suspending the product.

The acceleration rate of the centrifuge during the washing and subsequent solid/liquid separation step can be constant or variable. According to a preferred embodiment, the acceleration rate is lower during the washing step, so as to increase the contact time. However, the acceleration rate may be increased when starting the subsequent solid/liquid separation step and/or at the end thereof.

The acceleration rate of the centrifuge for the washing is preferably 500 g or less, even more preferred 300 g or less, in particular 100 g or less. The acceleration rate for the subsequent solid/liquid separation is preferably at least 500 g, even more preferred at least 800 g, in particular at least 1000 g.

The washing step and the subsequent or concomitant solid/liquid separation step are preferably performed at a temperature of at least 20° C.

It may be advantageous to operate at a higher temperature during the washing step and associated subsequent or concomitant solid/liquid separation step than during the initial solid/liquid separation step. It is thus possible to operate at a temperature up to the boiling point of the protic solvent which is used.

Possible temperature ranges for these steps are in particular from 20 to 25° C., from 25 to 30° C., from 30 to 35° C., from 35 to 40° C., from 40 to 45° C., from 45 to 50° C., from 50 to 55° C., and from 55 to 60° C. and even up to 100° C. for water.

The washing step and the associated solid/liquid separation (preferably including centrifugal centrifugation) step may optionally be repeated one or more times, in exactly the same manner or in a different manner. For example, different protic solvents, different washing durations, different acceleration rates, and/or different temperatures may be used in the various washing and solid/liquid separation steps.

After the last solid/liquid separation (preferably including centrifugal filtration), the recovered solid may be dried.

The drying step can be realized in a conventional manner, for instance at a temperature ranging from 100° C. to 280° C., and under atmospheric pressure or, preferably, under reduced pressure, for instance at a pressure of 30 mbar.

Ultimately, polyether ketone ketone obtained is substantially pure. In particular, the ash content of the polyether ketone ketone is preferably less than 0.5 wt. %, preferably less than 0.3 wt. % and in particular less than 0.1 wt. %. The ash content is measured by determining the residual mass of a PEKK sample of a given weight after calcination in a furnace at 600° C. during 24H and dividing said residual mass by the mass of the PEKK sample before calcination.

The polyether ketone ketone obtained according to an embodiment of the invention can subsequently be compounded and/or formed into the appropriate shape in view of further transformation and final use.

EXAMPLES

The following examples illustrate embodiments of the invention without limiting it. Unless specified otherwise, the experiments were carried out at room temperature.

Examples 1-8

Initial Solid/liquid Separation in Centrifuge

A reaction mixture comprising polyether ketone ketone (molar ratio T:I =60/40), prepared by electrophilic substitution with aluminum chloride as a Lewis acid, as obtained after contacting the product mixture with a protic solvent (aqueous solution of HCl at 3.3 wt. %), was submitted to a solid/liquid separation step performed on a laboratory scale centrifuge (Model RA-20 by Rousselet Robatel, bowl size diameter 18 cm and height 10 cm) with variable values regarding acceleration and duration.

In comparative example 1, the same reaction mixture was submitted to a filtration on a Nutsche filter under nitrogen pressure of 2 bars.

The residual humidity and aluminum content of the crude polyether ketone ketone thus obtained was characterized as follows.

The residual humidity was measured using a halogen moisture analyzer (Mettler Toledo HR73) at 200° C. until constant weight.

The residual aluminum was measured according to the following procedure:

0.5 g of polyether ketone ketone sample are weighed into a graduated 25 mL sampler tube;

addition of 10 mL of nitric acid (concentration 67 wt. %);

introduction of the mixture into a heater unit and heating to 99° C. for 2 h;

filtration of the mixture on a Whatman filter (grade 589/1, diameter 125 mm); and adding milly Q water up to the graduation of 25 mL.

The resulting crude PEKK sample was analyzed using inductively coupled plasma/optical emission spectrometry (ICP/OES, model ICP Vista-Pro sold by Varian, wavelength: 396.15 nm for aluminum element). A standard was passed before and after each sample to check the base line.

The results are shown in table 1 below. The results demonstrate that centrifugal filtration performs markedly better when separating crude polyether ketone ketone compared to filtration under pressure, both in terms of time and efficiency.

TABLE 1

Residual humidity and aluminum of crude PEKK after solid/liquid separation

| Ex. | Solid/liquid separation | acceleration [$g_n$*] | Duration [min] | Residual humidity [%] | Residual aluminum [%] |
|---|---|---|---|---|---|
| Comp. Ex. 1 | Filtration | ** | 180 | 85 | 8 to 10 |
| 1 | Centrifugal filtration | 225 | 1 | 74.4 | ND |
| 2 | Centrifugal filtration | 530 | 1 | 69.7 | ND |
| 3 | Centrifugal filtration | 905 | 1 | 66.7 | ND |
| 4 | Centrifugal filtration | 1000 | 1 | 66.0 | 7.8 |
| 5 | Centrifugal filtration | 1000 | 15 | 64.5 | 6.4 |
| 6 | Centrifugal filtration | 1000 | 30 | 66.0 | 6.5 |
| 7 | Centrifugal filtration | 1240 | 1 | 64.5 | ND |
| 8 | Centrifugal filtration | 1600 | 1 | 63.0 | ND |

*g = 9,80665 m · s$^{-2}$
** filtration under nitrogen pressure of 2 bars

Indeed, even under moderate acceleration (225 g), or using a short operating time (1 minute under an acceleration of 1000 g), centrifugal filtration was more efficient than filtration in terms of residual humidity and at least as good in terms of aluminum extraction.

Regarding the operating parameters of the centrifuge, it may be noted that when the operating time exceeds 30 minutes, the residual humidity did not improve. Further, raising the acceleration rate to a value above 1000 g leads to a more limited improvement of the residual humidity.

Example 9

Washing Crude PEKK in Centrifuge

In the present example, the crude PEKK slurry was washed immediately following initial solid/liquid separation, once with methanol and twice with water, using a centrifuge.

93kg of PEKK slurry obtained after contacting the product mixture with a protic solvent were charged in a centrifuge (Model SLAB423E by Rousselet-Robatel) and submitted to a 1000 g acceleration for 25 minutes.

The cake obtained was washed with 70 kg of methanol at 500 g, raised to 1000 g for the last 10 minutes of the duration of the centrifuge cycle. The washed cake was further washed twice with 30 kg of water, respectively, using the same acceleration scheme.

The total time required for the solid/liquid separation and the subsequent washing sequence in the centrifuge was approximately 1 hour. Following washing, 7 kg of wet PEKK with a humidity of 55.2 wt. % and 140 ppm of residual aluminum are obtained.

Comparative Example 1

Washing Crude PEKK on Filter

The same quantity of crude PEKK polymer used in the preceding example is washed with an equivalent amount of methanol and water per kg of dry PEKK on a filter (Nutsche filter dryer from Rosenmund) and filtered under a nitrogen pressure of 2 bars after each washing step.

The methanol washing is divided in 3 sequences including one reslurrying and takes at least 4 hours. For water, the washing is operated in 2 reslurrying steps and takes at least 3 hours.

At the end, a product with a residual humidity of 73.2% is obtained. It is further noted that the results of conventional filtration are markedly less reproducible compared to centrifugal filtration. In particular, the aluminum content found in the PEKK washed according to the comparative example varied within a large interval of 140 to 1100 ppm.

TABLE 2

Residual humidity and aluminum of PEKK after washing

| Ex | Solid/liquid separation | Acceleration [$g_n$*] | Duration [min] | Residual humidity [%] | Residual aluminum [ppm] |
|---|---|---|---|---|---|
| REF | Filtration | ** | >840 | 73.2 | 140-1100 |
| 9 | Centrifugal filtration | 1000 | 60 | 55.2 | 140 |

*g = 9,80665 m · s$^{-2}$
** filtration under nitrogen pressure of 2 bars

Example 10 A-C

Filter Cake Resistance of Crude PEKK as a Function of Pressure

The filter specific cake resistance of crude PEKK as obtained after contacting the product mixture with a protic solvent (aqueous solution of HCl at 3.3 wt. %) was determined for different pressures.

The comparative example 1 was repeated as explained above adjusting the nitrogen pressure to 1, 2 and 3 bars, respectively, and the filtration pressure was determined as follows.

The filter cake specific resistance $R_s$ was calculated by plotting the filtration time divided by the filtered volume (t/V) as a function of the filtered volume (V), by measuring the slope of the corresponding graph in the area where the regime is substantially linear, and by referring to the following Kozeny-Carman equation:

$$t=(R_0 \cdot \mu \cdot V)/(A \cdot \Delta P)+(R_s \cdot \mu W \cdot V^2)/(2A^2 \cdot \Delta P),$$

wherein:
t is the filtration time expressed in s,
$R_0$ is the specific resistance of the filtering medium expressed in $m^{-1}$,
$\mu$ is the viscosity of the filtrate at the filtration temperature in Pa·s,
V is the filtered volume at time t expressed in $m^3$,
A is the filtration surface is $m^2$,
$\Delta P$ is the pressure drop across the filter (including the cake and the filtering medium) expressed in Pa,
W is the dry solid concentration of the suspension to be filtered in $kg/m^3$ and
$R_s$ is the cake specific resistance in m/kg.

The results are given in table 3 below.

TABLE 3

Filter cake resistance of PEKK for different pressures

| Example | Pressure [bar] | Filter cake resistance $R_s$ [$10^{10}$ · m/Kg] |
|---|---|---|
| 10A | 1 | 0.7 |
| 10B | 2 | 0.3 |
| 10C | 3 | 0.09 |

The results show that crude PEKK, surprisingly, does not have the expected behavior, that is, a filter cake specific resistance that increases with pressure, but on the contrary shows a better draining when filtered under higher pressure.

However, a PEKK with low residual humidity may be obtained by applying a directional force on the granules during filtration. An appropriate directional stress may be applied in centrifugal filtration, and may be adjusted readily by changing the acceleration rate.

As explained above, a low residual humidity allows for a gain in drying time and energy and furthermore also improves the recuperation of residual Lewis acid. As a consequence, it is possible to extract the aluminum ions down to a residual content of less than 250 ppm under mild temperature conditions and without the use of complexing agents.

Further, it may be advantageous to implement the centrifugal filtration of the solid/liquid separation step and the subsequent washing steps in the same device so as to improve washing efficiency and to avoid the transfer of the crude product, gain time and improve efficiency.

The method proposed thus allows the manufacture of polyether ketone ketone with a high purity and a high yield, which can be implemented at the industrial scale in an economically realistic manner.

Embodiments

1. A method for the manufacture of polyether ketone ketone (PEKK), comprising, or consisting of, the steps of:
   (i) reacting 1,4-bis(4-phenoxybenzoylbenzene) and/or diphenylether with at least one difunctional aromatic acyl chloride, in a reaction solvent and in presence of a Lewis acid, to obtain a product mixture comprising a PEKK-Lewis acid complex;
   (ii) contacting the obtained product mixture with a protic solvent so as to form a dispersion that comprises a liquid phase comprising Lewis acid and a second phase, e.g., a solid phase, comprising PEKK; and
   (iii) separating the second phase of the dispersion from the liquid phase, so as to recover a crude PEKK and an effluent containing Lewis acid,
wherein step (iii) comprises a step of centrifugal filtration.

2. The method of embodiment 1, wherein the at least one difunctional aromatic acyl chloride is selected from terephtalic acid chloride, isophtalic acid chloride and the mixtures thereof.

3. The method of any one of embodiments 1 or 2, wherein the reaction solvent is ortho-dichlorobenzene.

4. The method of any one of embodiments 1 to 3, wherein the Lewis acid is aluminum trichloride.

5. The method of any of embodiments 1 to 4, wherein the protic solvent used in step (ii) is an aqueous solution, which preferably has a pH of not more than 5, more preferably not more than 3 and preferably not more than 2.

6. The method of any of embodiments 1 to 5, comprising after step (iii) further one or more steps of washing the crude PEKK in a protic solvent, preferably an alcoholic aqueous solution, and subjecting the resulting mixture to a further solid/liquid separation, preferably comprising a step of centrifugal filtration.

7. The method of any of embodiments 1 to 6, comprising after step (iii) further one or more steps of washing the crude PEKK in a protic solvent, preferably water, and subjecting the resulting mixture to a further solid/liquid separation, preferably comprising a step of centrifugal filtration.

8. The method of any of embodiments 1 to 7, comprising after step (iii):
   (iv) one or more steps of washing the crude PEKK in methanol, and subjecting the mixture obtained to a solid/liquid separation comprising a step of centrifugal filtration; and
   (v) one or more steps of washing the PEKK obtained in the previous step in water, and subjecting the mixture obtained to a solid/liquid separation comprising a step of centrifugal filtration to obtain a purified PEKK.

9. The method of any of embodiments 1 to 8, wherein step (iii) and each subsequent washing step is performed in a centrifugal filtration device, without removing the crude PEKK between subsequent steps.

10. The method of any of embodiments 1 to 9, wherein the step of centrifugal filtration in step (iii) is performed at an acceleration rate of at least 500 g.

11. The method of any of embodiments 2 to 10, wherein step (iii) and each subsequent washing step is performed for a duration of one hour or less, preferably 30 minutes or less and in particular 15 minutes or less.

12. The method of any one of embodiments 1 to 11, further comprising a subsequent step of drying the purified PEKK.

13. The method of any one of embodiments 1 to 12, wherein the crude PEKK is purified without using a complexing agent.

14. The method of any one of embodiments 1 to 13, wherein the purified PEKK contains less than 1000, preferably 500, and in particular 250 ppm of aluminum.

15. The method of any one of embodiments 1 to 14, wherein the effluent containing Lewis acid is recycled, notably as a flocculation agent for water treatment.

The invention claimed is:

1. A method for the manufacture of polyether ketone ketone (PEKK), comprising the steps of:
    (i) reacting 1,4-bis(4-phenoxybenzoylbenzene) and/or diphenylether with at least one difunctional aromatic acyl chloride, in a reaction solvent and in presence of a Lewis acid, to obtain a product mixture comprising a PEKK-Lewis acid complex;
    (ii) contacting the obtained product mixture with a protic solvent so as to form a dispersion that comprises a liquid phase comprising Lewis acid and a second phase comprising PEKK; and
    (iii) separating the second phase of the dispersion from the liquid phase, so as to recover a crude PEKK and an effluent containing Lewis acid,
wherein step (iii) comprises a step of centrifugal filtration, wherein the method comprises after step (iii) further one or more steps of washing the crude PEKK, and subjecting the resulting mixture to a further solid/liquid separation, wherein the one (or more) washing step is (are) performed in a centrifugal filtration device, without removing the crude PEKK between subsequent steps.

2. The method of claim 1, wherein the at least one difunctional aromatic acyl chloride is selected from terephtalic acid chloride, isophtalic acid chloride and the mixtures thereof.

3. The method of claim 1, wherein the reaction solvent is ortho-dichlorobenzene.

4. The method of claim 1, wherein the Lewis acid is aluminum trichloride.

5. The method of claim 1, wherein the protic solvent used in step (ii) is an aqueous solution, which has a pH of not more than 5.

6. The method of claim 1, wherein said further one or more steps of washing the crude PEKK is carried out in an alcoholic aqueous solution.

7. The method of claim 1, wherein said further one or more steps of washing the crude PEKK is carried out in water.

8. The method of claim 1, wherein the steps of washing the crude PEKK, and subjecting the resulting mixture to a further solid/liquid separation comprise:
    (iv) one or more steps of washing the crude PEKK in methanol, and subjecting the mixture obtained to a solid/liquid separation comprising a step of centrifugal filtration; and
    (v) one or more steps of washing the PEKK obtained in the previous step in water, and subjecting the mixture obtained to a solid / liquid separation comprising a step of centrifugal filtration to obtain a purified PEKK.

9. The method of claim 1, wherein the step of centrifugal filtration in step (iii) is performed at an acceleration rate of at least 500 g.

10. The method of claim 2, wherein step (iii) and each subsequent washing step is performed for a duration of one hour or less.

11. The method of claim 1, further comprising a subsequent step of drying the purified PEKK.

12. The method of claim 1, wherein the crude PEKK is purified without using a complexing agent.

13. The method of claim 1, wherein the purified PEKK contains less than 1000 ppm.

14. The method of claim 1, wherein the effluent containing Lewis acid is recycled.

* * * * *